United States Patent
Qi et al.

(10) Patent No.: US 8,566,635 B2
(45) Date of Patent: Oct. 22, 2013

(54) METHODS AND SYSTEMS FOR IMPROVED STORAGE REPLICATION MANAGEMENT AND SERVICE CONTINUANCE IN A COMPUTING ENTERPRISE

(75) Inventors: Yanling Qi, Austin, TX (US); Scott W. Kirvan, Austin, TX (US); Guy Martin, Wichita, KS (US); Robert R. Stankey, Wichita, KS (US)

(73) Assignee: LSI Corporation, San Jose, CA (US)

( * ) Notice: Subject to any disclaimer, the term of this patent is extended or adjusted under 35 U.S.C. 154(b) by 284 days.

(21) Appl. No.: 13/011,195

(22) Filed: Jan. 21, 2011

(65) Prior Publication Data

US 2012/0192006 A1 Jul. 26, 2012

(51) Int. Cl.
*G06F 11/00* (2006.01)
(52) U.S. Cl.
USPC .......................................... 714/6.3; 711/162
(58) Field of Classification Search
USPC .................. 714/6.21, 6.22, 6.3, 4.11; 711/162
See application file for complete search history.

(56) References Cited

U.S. PATENT DOCUMENTS

| 7,043,665 | B2 * | 5/2006 | Kern et al. ..................... 714/5.11 |
| 7,114,094 | B2 * | 9/2006 | Soejima ......................... 714/6.3 |
| 7,734,947 | B1 | 6/2010 | Frangioso et al. |
| 2005/0050273 | A1 * | 3/2005 | Horn et al. ..................... 711/114 |
| 2005/0193237 | A1 * | 9/2005 | Topham ............................ 714/6 |
| 2006/0215456 | A1 | 9/2006 | Chen |
| 2007/0067666 | A1 * | 3/2007 | Ishikawa et al. .................. 714/6 |

* cited by examiner

*Primary Examiner* — Yolanda L Wilson
(74) *Attorney, Agent, or Firm* — Duft, Bornsen, Fettig LLP

(57) ABSTRACT

Systems and methods for management of replicated storage. Features and aspects hereof provide management of data replication among a plurality of storage systems in a manner substantially transparent to host systems attached to the storage systems. The storage systems are coupled to one another through a replication link. One storage systems is designated the primary storage system and all others are designated secondary storage systems. A common logical volume is defined with a common logical volume device identifier used by all of the replicating storage systems of a replication group and their respective attached host systems. The primary storage system processes I/O requests directed to the logical volume by accessing its physical storage volume and forwarding the request to be replicated to all secondary storage systems over the replication link. Secondary storage systems process I/O requests by shipping them over the replication link to the primary storage system for processing.

15 Claims, 6 Drawing Sheets

METHODS AND SYSTEMS FOR IMPROVED STORAGE REPLICATION MANAGEMENT AND SERVICE CONTINUANCE IN A COMPUTING ENTERPRISE

BACKGROUND

1. Field of the Invention

The invention relates generally to storage replication systems in an enterprise and service continuance using the replicated storage. More specifically, the invention relates to methods and structures for improving management of replicated storage systems and use of the replicated storage to continue service in a manner that is transparent to attached host systems.

2. Discussion of Related Art

In computer data storage applications that require high reliability and high availability, it is generally known to provide replication/duplication of the stored data and/or other forms of redundancy to permit continued operations in the presence of certain types of failures. In the context of a single site, a storage system may provide for redundant links between computing systems and storage systems as well as redundancy within the storage system (e.g., multiple storage controllers providing RAID storage management over multiple storage devices).

In a larger context, even with all the above identified lower level redundancy, it is possible for an entire computing site to fail in a catastrophic manner. For example, should a computing center flood or be destroyed in some manner, all the on-site redundancy may be insufficient to assure integrity of the data stored at that computing center. Thus, it is also known to provide for data replication at a larger scale. For example, data for an entire computing center may be replicated at one or more other computing centers to reduce the possibility of total loss of data due to destruction or other loss of one computing center. Disaster recovery plans and systems generally rely on such replication to permit continuation of services at a second site when a first site is destroyed or otherwise disabled.

In a disaster recovery configuration, business critical data in one physical location is remotely replicated to a site which is geographically separated from the first location. The remote data replication technology is volume remote replication provided by storage array vendors across SAN replication links. With this feature, a replication group consisting of a primary volume and one or more mirrored (or secondary) volumes is created. Each of the primary volume and the one or more secondary volumes are created on different sites. As presently practiced, the mirrored (i.e., secondary) volume(s) of the replication group is/are often "write-protected" to avoid data corruption. Both the mirrored volume and the primary volume have unique SCSI device identifiers. Traditionally storage array vendors and disaster recovery solution vendors have supplied additional integration components and required end-user manual actions to overcome the limitations of this setup in a multi-site disaster recovery environment. Even then the existing approaches leave end-users susceptible to short periods of application downtime.

When business critical data in one site becomes unavailable due to disaster, hardware failure, or other unpredictable conditions that disable the site, the business services continue at another site by using the replicated data on one of the replicated, mirrored, secondary volumes. Data management in a multiple-site disaster recovery scenario is a complicated process with existing solutions as presently practiced. The data management tasks for utilizing present replication techniques include:

Service management. The software applications utilizing the replication group must be provisioned on all sites.

Service resource management. Data storage is an application resource. The data storage resource must be provisioned and configured within the application. Since primary volumes and remote replication volumes have different "SCSI device identifiers", the relationship between a primary volume and replicated volume(s) must be correlated and saved into a site manager database. The correlation of volumes of the replication group requires storage vendor specific management interfaces and integration.

Resource failover/failback management. When an application service must be failed over to another site, its data storage must be failed over as well. The role changes for the volumes in the replication group needs to be managed via storage vendor specific management interfaces and be integrated with the site management and application software.

Some vendors' site management software products, such as VMWare vCenter Site Recovery Manager (SRM), have automated certain provisioning and management operations. The automation requires that each storage vendor provide SRM plugins which implement the VMWare SRM specification. Though VMWare SRM is popular and relatively common, many other site recovery management paradigms and specifications are known in the industry. Thus, storage system vendors may have to implement different plugins for each disaster recovery management product they want to support.

Most disaster recovery management products are not deeply integrated with storage vendors. Most storage/application provisioning and management operations are essentially manual procedures. The manual nature of the procedures to provision and manage the disaster recovery significantly affects both RTO (Recovery Time Objective) and RPO (Recovery Point Objective)—both being common metrics for disaster recovery products and techniques. The manual procedures also increase the TCO (Total Cost of Ownership) due to the human labor costs in performing the procedures.

For volumes in a replication group, one volume is the source (primary) volume of the replication group and one or more other volumes are the target (secondary) volume(s). A secondary volume is generally either inaccessible from the servers or is protected as read-only. The read-only or inaccessible attributes of the secondary volume creates a number of restrictions for application resource management. With the server virtualization application, the storage volume resources are deeply coupled with virtual machines. If one virtual machine needs to failover, all virtual machines that reply on the same underlying storage resource must be failed-over together. Similarly, if the underlying storage volume needs to be failed over, affected virtual machines must be failed over as well. Since the secondary volume(s) is/are write protected (e.g., read-only or totally inaccessible) the metadata describing the replication group current configuration and the failover policies may be difficult to update or even impossible to access without manual (operator) intervention.

Thus it is an ongoing challenge to provide simple, cost-effective, management and failover processing for multi-site storage replication environments.

SUMMARY

The present invention solves the above and other problems, thereby advancing the state of the useful arts, by providing methods and systems for replication of data between a plurality of storage systems and failover processing amongst the storage systems in a substantially automated manner that is transparent to attached host systems. The plurality of storage systems in a replication group are interconnected by replication links. One of the storage systems is a primary storage system and all other storage systems in the replication group are designated as secondary storage systems. The storage systems exchange information over the replication links to perform required replication of data. A single, common logical volume is defined within each storage system of the replication group such that all host systems access a replicated physical storage volume using the same logical volume device identifier. Each storage system of the replication group maps the logical volume to its physical storage volume that forms the replication group. Write I/O requests received by the primary storage system of the replication group are processed by storing the data in the primary physical storage volume of the primary storage system and transmitting the stored data to one or more secondary storage systems via the replication link to permit replicated storage of the data on the secondary physical storage volumes of each of one or more secondary storage systems. Write I/O requests received in a secondary storage system are shipped, via the replication link, to the primary storage system to be processed as above. Watchdog signals are exchanged between the various storage systems of the replication group via the replication link to permit detection of a failure and to trigger failover processing.

In one aspect hereof, a system is provided comprising a primary storage system and a secondary storage system. The primary storage system further comprises a primary physical storage volume having an associated primary physical volume device identifier; and a primary storage controller coupled with the primary physical storage volume. The secondary storage system further comprises a secondary physical storage volume having an associated secondary physical volume device identifier different than the primary physical volume device identifier; and a secondary storage controller coupled with the secondary physical storage volume. The system further comprises a replication communication link coupling the primary storage controller with the secondary storage controller. A logical volume is defined within both the primary storage system and the secondary storage system. The logical volume has an associated logical volume device identifier common to both the primary storage controller and the secondary storage controller. The secondary storage system is adapted to process a write I/O request directed to the logical volume device identifier from an attached host system by shipping, via the replication link, the write I/O request to the primary storage controller for processing by the primary storage system. The primary storage system is adapted to process a write I/O request directed to the logical volume device identifier received from an attached host system or received from the secondary storage system by storing write data on the primary physical storage volume and transferring the data to the secondary storage controller, via the replication link, to be stored on the secondary physical storage volume.

Another aspect hereof provides a method and a computer readable medium storing instructions for the method. The method for managing storage replication between a primary storage system and a secondary storage system coupled by a replication link. The method comprises defining a primary physical storage volume having an associated primary physical volume device identifier within the primary storage system, defining a secondary physical storage volume having an associated secondary physical volume device identifier within the secondary storage system, and defining a logical volume within both the primary storage system and the secondary storage system. The logical volume has an associated single logical volume device identifier common to both the primary storage system and the secondary storage system. The method further comprises processing a write I/O request received in the primary storage system from an attached host system requesting access to the logical volume. The step of processing further comprises storing data associated with the request on the primary physical storage volume, transmitting the data from the primary storage system to the secondary storage system over a replication link coupling the primary storage system with the secondary storage system, and storing the data on the secondary physical storage volume. The method further comprises processing another write I/O request received in the secondary storage system from an attached host system requesting access to the logical volume. The step of processing the another write I/O request further comprises shipping, over the replication link, the request to the primary storage system for processing as a request received by the primary storage system.

DETAILED DESCRIPTION OF THE DRAWINGS

Figure 1:
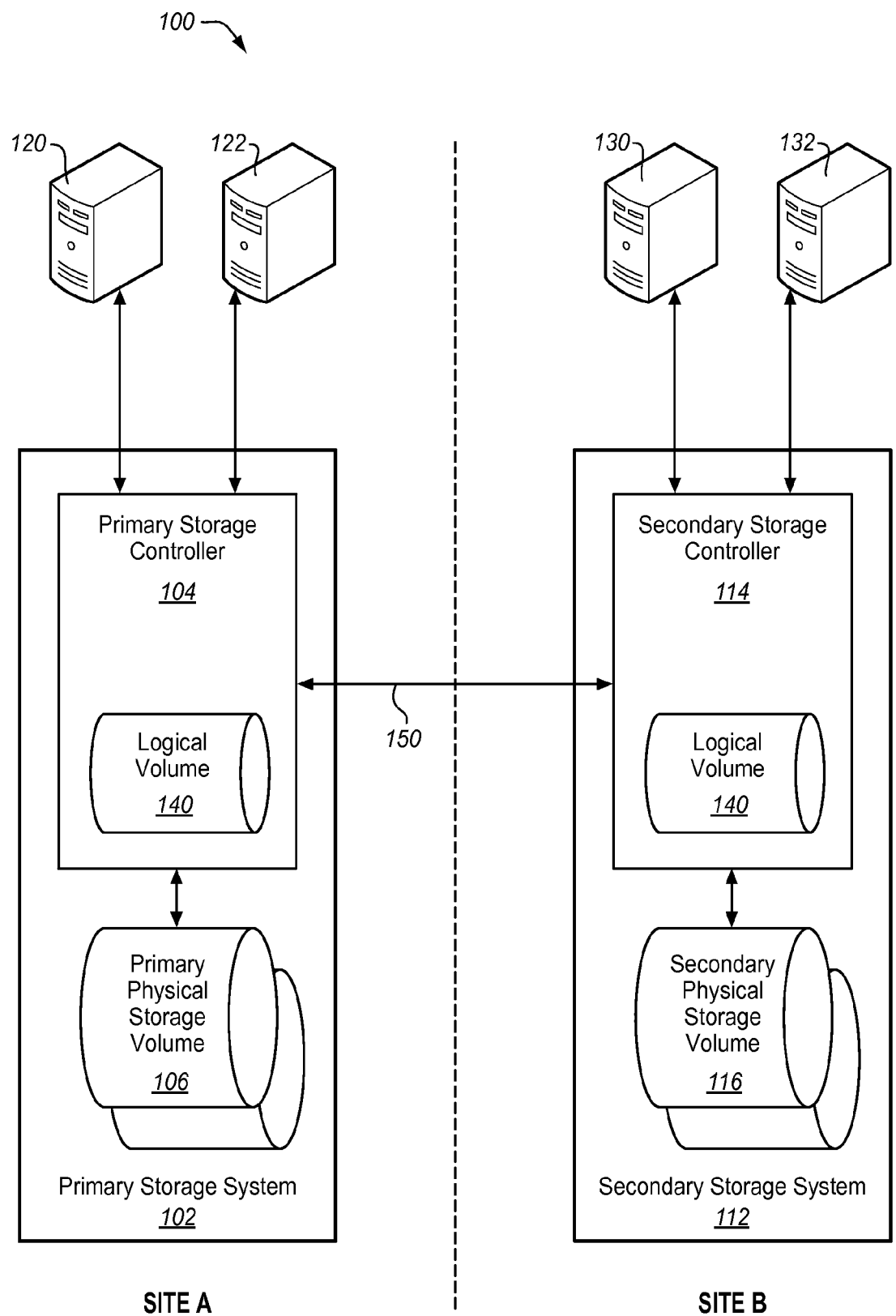
FIG. 1 is a block diagram of an exemplary system with improved replication and failover capabilities in accordance with features and aspects hereof

FIG. 1 is a block diagram of an exemplary system 100 providing storage replication in accordance with features and aspects hereof System 100 includes two or more sites, e.g., "Site A" and "Site B". Though only two sites are depicted, any number of sites may be configured as a "replication group" of system 100. Site A comprises primary storage system 102 and Site B comprises secondary storage system 112. Primary storage system 102 comprises primary storage controller 104 adapted to process I/O requests from any of host systems 120 and 122 requesting access to primary physical storage volume 106. Secondary storage system 112 includes secondary storage controller 114 adapted to process I/O requests to access secondary physical storage volume 116 received from any of host systems 130 and 132. Primary physical storage volume 106 and secondary physical storage volume 116 each comprise one or more physical storage devices including, for example, magnetic or optical rotating disc drives or solid-state storage devices (e.g., RAMdisks or flash memory disk components). In some embodiments, primary physical storage volume 106 and secondary physical storage volume 116 may each comprise one or more RAID storage volumes to provide enhanced reliability and/or performance. Both primary physical storage volume 106 and secondary physical storage volume 116 have corresponding device identifiers utilized by respective storage controllers 104 at 114 to access data stored thereon. A host system (e.g., the operating system on a host system 120, 122, 130, and 132) discovers and identifies storage devices (logical units) by device identifiers. In one exemplary embodiment, the host system sends SCSI Inquiry VPD pages to request a storage device's identifier. The primary VPD page is VPD page 83h which reports a unique identifier.

Host systems 120, 122, 130, and 132 may be any suitable computing devices/systems including, for example, servers, workstations, PCs, etc. Host systems 120, 122, 130, and 132 are coupled with storage systems 102 and 112, respectively, utilizing any suitable communication medium and protocol including, for example, Ethernet, Fibre Channel, parallel or serial attached SCSI, etc. Any number of such host systems may be coupled with each of storage systems 102 and 112. Primary and secondary storage controllers 104 and 114 may each comprise any suitable computing device and/or other electronic control devices suitable to receive I/O requests from attached host systems and to process the I/O requests to access their respective physical storage volumes 106 and 116. In one exemplary embodiment, storage controllers 104 and 114 comprise programmable general and/or special purpose processors (not shown) executing programmed instructions to control operations of their respective storage systems 102 and 112. Primary storage system 102 and secondary storage system 112 are communicatively coupled through replication link 150 (i.e., via their respective controllers 104 and 114). Replication link 150 may comprise any suitable communication medium and protocol including, for example, Fibre Channel, iSCSI, InfiniBand, Fibre Channel over Ethernet, etc.

As noted above, present storage replication systems and methods require host systems (120, 122, 130, and 132) to retain significant configuration knowledge regarding the physical storage volumes in the storage systems of the replication group. Such information may comprise, for example, the device identifier associated with the physical storage volumes to which each host system is directing its I/O requests. This information is required, among other reasons, to enable failover processing for the replication processing to be performed under control of the attached host systems. This device identifier information must be updated appropriately when one of the storage systems (102 or 112) fails. By contrast, and in accordance with features and aspects hereof, primary storage system 102 and secondary storage system 112 each provide for definition of a logical volume 140 sharing a common device identifier to be utilized by all host systems 120, 122, 130, and 132. The logical volume 140 is defined within primary storage controller 104 and within secondary storage controller 114 to utilize identical device identifier information. I/O requests from attached post systems 120, 122, 130, and 132 may therefore utilize a single common device identifier in I/O requests directed to physical storage volume 106 and 116 of primary storage system 102 and secondary storage system 112, respectively.

It will be recognized by those of ordinary skill in the art that the designation of "primary" and "secondary" is with respect to a corresponding common logical volume managed by the storage systems of the replication group. Thus, a storage system may be the "primary" storage system with respect to a first logical volume (mapped to a corresponding first physical storage volume) and may act in the role of a "secondary" storage system with respect to another logical volume (mapped to a corresponding other physical storage volume). More generally, each storage system may be configured to act as a primary storage system for any number of logical volumes (each associated with a corresponding physical storage volume) and may be configured as a secondary storage system for any number of logical volumes (each associated with a corresponding physical storage system). The following description focuses on an exemplary embodiment where a single storage system (102) is designated as the primary system for a single logical volume 140 and only one secondary storage system (112) is associated with that same logical volume 140.

In operation, primary storage system 102 and secondary storage system 112 exchange information over replication link 150 to implement data replication between two storage systems and to coordinate failover processing in the event of a failure of one of the storage systems or failure of the replication link 150. As noted above, any number of storage systems may be configured in a replication group all coupled by corresponding replication links. In one exemplary embodiment, primary storage system 102 receives I/O requests from any attached host systems in Site A (e.g., 120 and 122). Each such I/O request will be directed to a device identifier identifying the logical volume 140 (i.e., directed to the logical volume device identifier associated with logical volume 140). Primary storage controller 104 maps a received I/O request directed to the identified logical volume 140 into corresponding I/O requests to access primary physical storage volume 106. Where the I/O request is a write I/O request, any data written to primary physical storage volume 106 will also be duplicated (replicated) over replication link 150 to permit secondary storage controller 114 to record the same data at corresponding locations of secondary physical storage volume 116. Secondary storage system 112 receives I/O requests from any attached host systems in Site B (e.g., 130 and 132). Such received I/O requests also include a device identifier identifying logical volume 140 as the intended target for the received I/O request. To assure proper coordination of the processing of the I/O request and the associated replication, secondary storage controller 114 forwards or ships a received write I/O request, over replication link 150 to primary storage controller 104 for processing as described above. In other words, secondary storage system 112 ships a received write I/O request to primary storage system 102 which, in turn, stores the supplied write data on primary physical storage volume 106, and transmits the stored data over replication link 150 to secondary storage controller 114 for replication on secondary physical storage volume 116 (appropriately mapped through logical volume 140).

In addition, primary storage controller 104 and secondary storage controller 114 exchange information over replication link 150 to coordinate failover processing in the event of failure of one of the storage systems or failure of replication link 150. For example, watchdog signals may be generated by primary storage controller 104 on a periodic basis and transmitted over replication link 150 to secondary storage controller 114. If secondary storage controller 114 senses the absence of such a watchdog signal after some predetermined timeout, it may thereby detect the failure of primary storage system 102 or detect a failure of replication link 150. Responsive to detecting a failure of primary storage system 102, secondary storage controller 114 may reconfigure itself to permit secondary storage system 112 to serve in the role of a backup primary storage system. In the backup primary storage system role, secondary storage system 112 may directly process write I/O requests as a primary storage system. Further, since any number of secondary storage systems may be present in system 100, secondary storage system 112 acting in the role of a backup primary storage system may provide for replication processing with other secondary storage systems. Upon detecting resumption of processing by primary storage system 102, well-known restoration techniques may be employed to restore secondary storage system 112 to its role as a secondary device in the replication of data. Other well-known processing techniques may be employed to determine that a sensed failure represents a failure of replication link 150, per se, rather than a failure of primary storage system 102. For example, well-known quorum techniques among a replication group of interconnected storage systems and/or computers may be utilized to determine that a detected failure is, in fact, a failure of replication link 150 rather than a failure of primary storage system 102.

Further, those of ordinary skill in the art will recognize that similar processing may be performed to sense, within primary storage system 102, a failure of secondary storage system 112 and corresponding processing to adjust the replication and failover processing accordingly.

Figure 2:
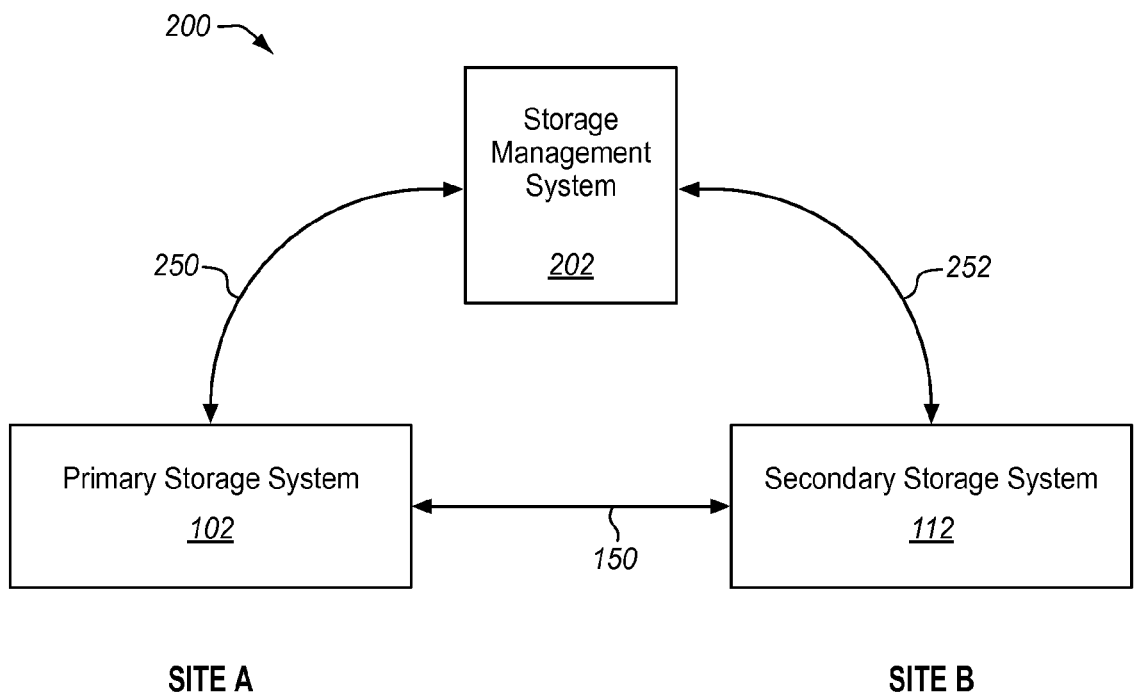
FIG. 2 is a block diagram of another exemplary system incorporating a storage management system to provide improved replication and failover capabilities in accordance with features and aspects hereof

FIG. 2 is a block diagram of another exemplary embodiment comprising system 200 in which primary storage system 102 (residing at Site A) and secondary storage system 112 (residing at Site B) are coupled through replication link 150 and are also coupled with a storage management system 202 by communication paths 250 and 252 respectively. Storage management system 202 may be any suitable computing device providing a user interface for an administrative user to communicate with either or both of primary storage system 102 and secondary storage system 112. Storage management system 202 may, for example, provide initial configuration information for storage systems 102 and 112 to configure physical storage volumes associated with each storage system and to configure the logical volume having a common logical volume device identifier utilized within both primary and secondary storage systems. In addition, storage management system 202 may utilize quorum techniques or other arbitration techniques to aid in determining whether a sensed failure represents detection of a failure of primary storage system 102 or rather represents detection of a failure of replication link 150. Communication paths 250 and 252 may utilize any of several well-known communication media and protocols including, for example, Ethernet, Fibre Channel, Fibre Channel over Ethernet (FCoE), parallel or serial SCSI, etc. In general, storage management system 202 may communicate with both primary storage system 102 and secondary storage system 112 to determine what type of failure has been detected and to direct the failover processing (if any) to reconfigure the storage systems in response to a detected failure.

In general, detection of a failure of primary storage system 102 causes secondary storage system 112 to assume the role of a backup primary storage system. In such a role, secondary storage system 112 processes received I/O requests (including write I/O requests) directed to the logical volume. As noted above, such I/O requests will utilize the same device identifier to identify a logical volume as is used within the failed primary storage system. Still further, in general, detection of a failure of replication link 150 causes each of primary storage system 102 and secondary storage system 112 to perform appropriate processing to determine which of the replicated storage systems should continue processing I/O requests and which should enter an idle state in which all received I/O requests are rejected until the failed replication link 150 is repaired. Further details of methods associated with this replication and failover processing are provided herein below.

Those of ordinary skill in the art will readily recognize numerous additional and equivalent elements that may be present in fully functional systems such as systems 100 and 200 of FIGS. 1 and 2, respectively. Such additional and equivalent elements are omitted herein for simplicity and brevity of this discussion area.

Figure 3:
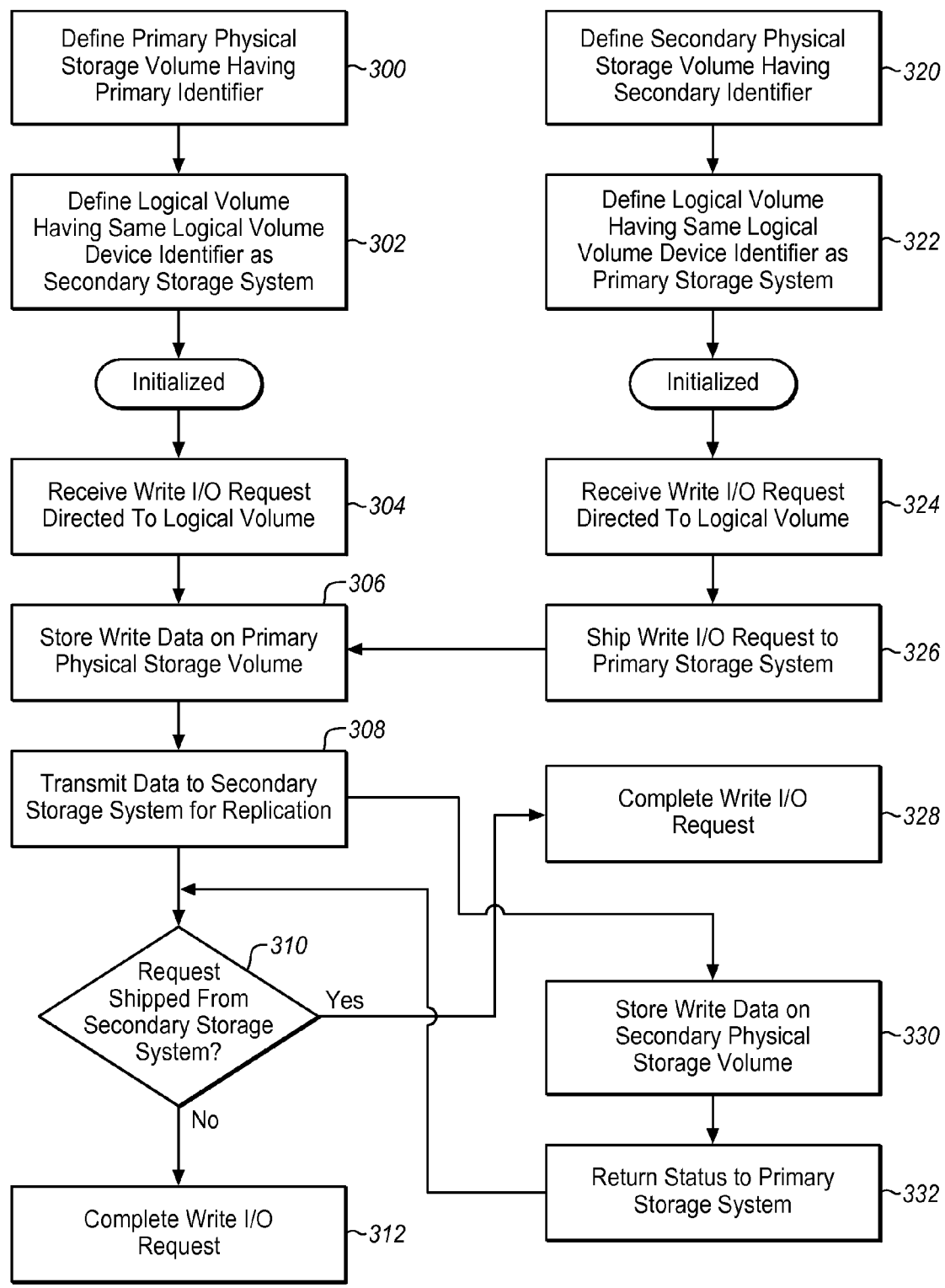
FIGS. 3 through 5 are flowcharts describing exemplary methods for improved replication and failover services in accordance with features and aspects hereof

FIG. 3 is a flowchart describing an exemplary method for improved storage replication processing among a plurality of storage systems in a replication group. The method of FIG. 3 may be operable, for example, in systems 100 and 200 of FIGS. 1 and 2, respectively. More specifically, steps 300 through 312 describe processing performed within primary storage system 102 while steps 320 through 332 describe processing performed within each of one or more secondary storage systems 112. Step 300 defines a primary physical storage volume within the primary storage system. The primary physical storage volume has an associated device identifier. Definition of the primary physical storage volume may be performed in conjunction with user interaction provided by an administrative user to initially configure the primary physical storage system and volume. Such administrative user input may be provided directly to the primary storage system through a diagnostic or administrative user interface thereof Alternatively, the user interaction may be performed with a storage management system which, in turn, forwards the user supplied configuration information to the primary storage system. Step 302 next defines a logical volume having an associated logical volume device identifier. As above in step 300, administrative user input may be provided to initially configure and define the logical volume and its associated logical volume device identifier.

Steps 300 and 302 generally represent initial setup or configuration of information in the primary storage system. In like manner, steps 320 and 322 represent similar initialization of one or more secondary storage systems. At step 320, operable within each secondary storage system, the secondary storage system is initially configured to have a defined secondary physical storage volume having an associated secondary physical storage volume device identifier. At step 322, each secondary storage system is also configured to define a logical volume having the same logical volume device identifier as provided within primary physical storage system (i.e., as initialized at step 302 of its initialization). The initialization also comprises configuring each storage system to recognize that it is a portion of a replication group of storage systems and to recognize a configured role as the primary or secondary storage system of the group.

Having completed initialization of both the primary and secondary storage systems by operation of steps 300, 302, 320, and 322, both the primary and secondary storage systems are ready to receive and process I/O requests. Each storage system operates asynchronously with respect to other storage systems of the replication group to receive and process I/O requests from respective attached host systems. At step 304, the primary storage system receives a write I/O request directed to its defined logical volume. As the primary storage system, step 306 stores the write data of the received write I/O request onto the primary physical storage volume associated with the logical volume device identifier received in the I/O request. At step 308 the stored data is then transmitted/forwarded over the replication link to the secondary storage system for replication thereon. Responsive to receipt of the data to be replicated, step 330, operable and the secondary storage system, stores the write data to be replicated on the secondary physical storage volume residing within the second storage system. Step 332 then returns a completion status signal over the replication link to the primary storage system indicating completion (i.e., success or failure) of writing of the replicated data. Returning to processing within the primary storage system, step 310 determines whether the write I/O request just completed was originally transmitted to this, the primary storage system, or was shipped from a secondary storage system (as discussed below). Where, as in this case, the write I/O request was originally directed to the primary storage system (i.e., by receipt at step 304), step 312 completes processing of the received write I/O request by returning an appropriate status to the requesting host system attached to the primary storage system. Thus, a write I/O request received by the primary storage system from an attached host system causes data to be stored on the primary physical storage volume of the primary storage system and to be replicated on the secondary physical storage volume within the secondary storage system.

The secondary storage system may also receive write I/O requests from its respective attached host systems. Step 324 represents receipt of a write I/O request directed to the logical volume as configured in the secondary storage system from an attached host system. As noted above, the logical volume device identifier used to access the storage volume is identical for I/O requests from all host systems attached to either the primary or secondary storage system. At step 326, in recognition of its role as a secondary storage system in the replication group, the secondary storage system ships or forwards the received write I/O request over the replication link to the primary storage system for processing therein. Steps 306 and 308 are then operable within the primary storage system in conjunction with steps 330 and 332 operable within the secondary storage system to process the shipped write I/O request in the same manner as discussed above for a write request received within primary storage system from one of its respective attached host systems. Upon return of status over the replication link from the secondary storage system by operation step 332 as discussed above, step 310, operable within the primary storage system, determines that the write I/O operation just processed was shipped from the secondary storage system. Thus, step 328, operable in the secondary storage system, completes the write I/O request by returning an appropriate status to the requesting host system attached to the secondary storage system.

As discussed above, information exchanged between the primary and secondary storage system to achieve the above replication may be transmitted through the replication link coupling the storage systems of the replication group. Those of ordinary skill in the art will further recognize that numerous additional and equivalent steps may be present in a fully operational method for replicating data between the primary and one or more secondary storage systems. In particular, the method of FIG. 3 is simplified to disregard processing for read I/O requests in that such processing is readily apparent to those of ordinary skill in the art. Still further, standard error recovery processing to handle errors encountered during write operations within either the primary or secondary storage system will be readily apparent to those of ordinary skill in the art.

Figure 4:
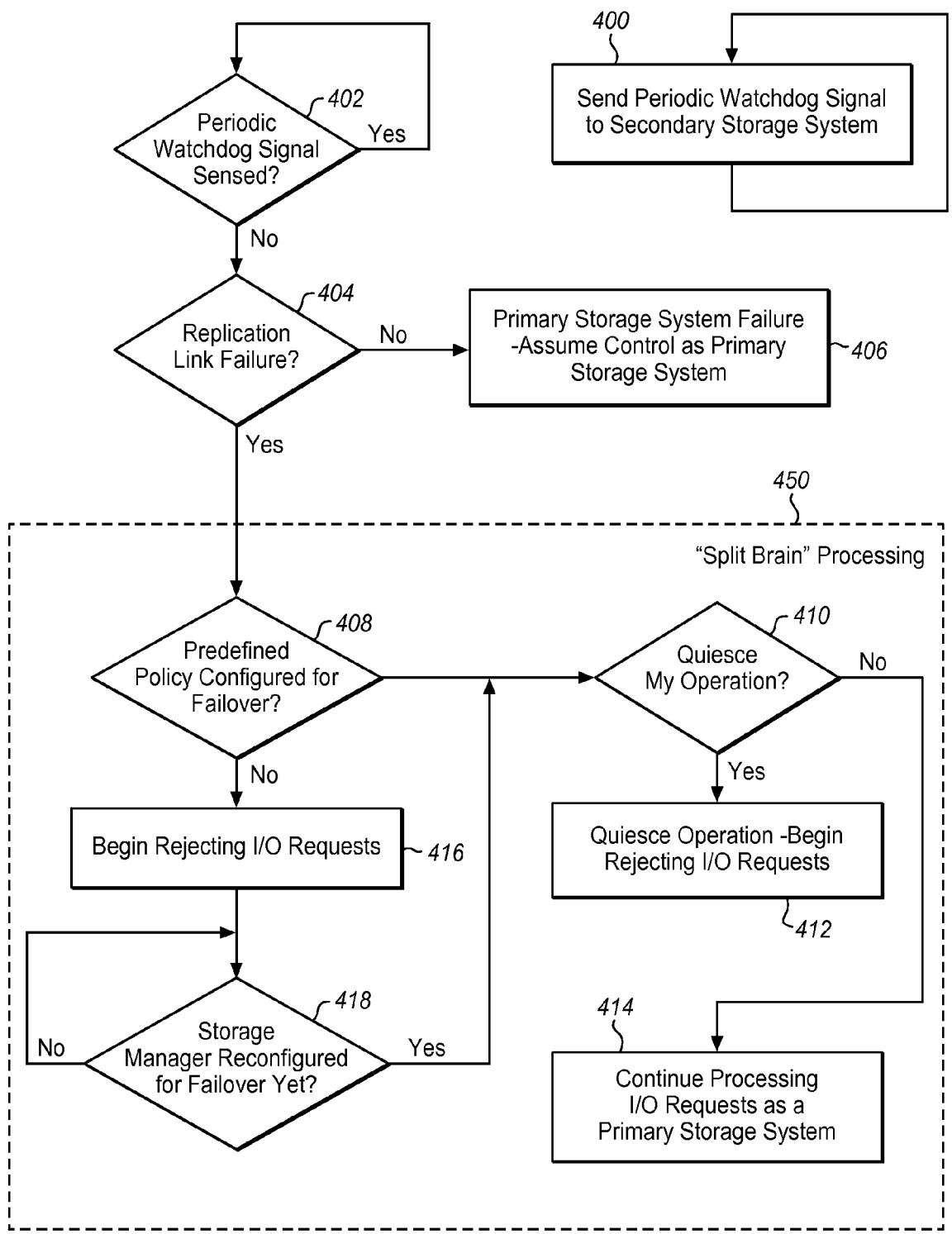

FIG. 4 is a flowchart describing another exemplary method in accordance with features and aspects hereof to provide for automated failover processing in a replication group responsive to detecting a failure in the system. The method of FIG. 4 may be operable, for example, in systems 100 and 200 of FIGS. 1 and 2, respectively. In general each storage system of the replication group generates a periodic watchdog signal transmitted to each of the other storage systems in the replication group. The successful transmission and receipt of the watchdog signal indicates that the transmitting system is in a proper operational state. Further, each storage system in the replication group monitors to detect receipt of a watchdog signal from each of the other storage systems. Failure to sense a periodic watchdog signal from another storage system indicates some form of failure in the replication group.

As more particularly shown in the method of FIG. 4, step 400 represents transmission of a periodic watchdog signal from the primary storage system to one or more secondary storage systems over the replication link coupling the storage systems systems. Steps 402 through 416 then represent corresponding processing within each of the one or more the secondary storage systems to detect a failure in the overall system due to loss of an expected watchdog signal from the primary storage system. Step 402 is iteratively operable to detect receipt of the expected periodic watchdog signal from the primary storage system. So long as the expected, periodic watchdog signals are received (within an appropriate timeframe), step 402 continues iteratively awaiting detection of loss of an expected periodic watchdog signal from the primary storage system. Upon detecting such a possible failure, step 404 determines whether the detected failure represents a failure of the primary storage system, per se, or rather represents failure of the replication link coupling the various storage systems of the replication group. If step 404 determines that the detected failure represents a failure of the primary storage system (rather than the replication link), step 406 reconfigures the secondary storage system to serve in the role of a backup primary storage system and begins processing directly any received write I/O requests. In other words, as a backup primary storage system, the secondary storage system begins processing all write I/O requests to store data on it secondary physical storage volume (without interaction with the failed primary storage system) rather than shipping write I/O requests to the primary storage system for processing. It will be understood by those of ordinary skill in the art that in a system where there are multiple secondary storage systems, one of the secondary storage systems will reconfigure to serve in the role of a backup primary storage system. In such a reconfigured state, other secondary storage systems may remain configured to cooperate with the backup primary storage system to continue providing replication features for write I/O requests processed by the newly reconfigured backup primary storage system.

If step 404 determines that the detected failure represents a failure of the replication link coupling the storage systems of the replication group, steps 408 through 416 are operable to determine how to reconfigure processing of the primary storage system and all secondary storage systems. Steps 408 through 418 are collectively identified as the "split-brain" processing 450. Reference to the "split-brain" indicates that a condition exists wherein all storage systems are presently operable but can no longer communicate through the replication link to coordinate replication of data. In such a case, one of the storage systems (e.g., the primary storage system or one of the secondary storage systems) will be configured to continue processing I/O requests while the other storage systems will be quiesced and start rejecting I/O requests. Upon eventual restoration of the replication link, well-known processing may then be invoked to synchronize the information between the physical storage volume of the storage system that remained active and the physical storage volume of all storage systems that were quiesced.

In one exemplary embodiment, essentially static, predefined policies or rules may be configured within the primary and secondary storage systems to identify which of the storage systems should continue processing I/O requests and which storage systems should be quiesced. Such predefined policies may be provided to all storage systems as an aspect of initialization and configuration of the storage systems (e.g., at time of installation and initial configuration). In another exemplary embodiment, a storage management system coupled with the primary storage system and with all secondary storage systems may arbitrate or otherwise determine which of the storage systems should remain active and which should be quiesced (e.g., by utilization of well-known quorum techniques or other arbitration techniques).

Steps 408 through 418 of split-brain processing 450 represent a generalized approach incorporating both embodiments. In particular, step 408 first determines whether predefined policies or rules have been configured in the storage systems for determining which storage system should remain active and which should be quiesced. If step 408 determines that predefined policies have been configured in the storage systems, step 410 then determines from the configured policies whether this storage system (presently configured as either a primary or secondary) should now be reconfigured as the primary storage system (e.g., a backup primary storage system) configured to continue processing requests or reconfigured to switch to an idle/quiesced state rejecting all requests. If this storage system is to enter a quiesced state, step 412 reconfigures this system to start rejecting all I/O requests and to thus enter a quiesced/idle state. If step 410 determines that this system is to continue processing I/O request (e.g., as a backup primary storage system), step 414 so reconfigures this storage system to act in the role of a backup primary storage system and to continue processing received I/O requests.

If step 408 determines that there are no predefined policies in the storage systems, some intervention is required to determine which of the storage systems should continue processing requests. In such a condition only intervention by a storage management system (or storage management operator) can resolve the split-brain condition to continue operation of one of the replicated storage systems and quiesce operation of the others. Step 416 reconfigures this storage system (i.e., each system so reconfigures itself) to start rejecting all I/O requests until some period of time has expired or until the storage manager has reconfigured all storage systems. Step 418 is then iteratively operable until some intervention by a storage management system or user reconfigures each of the storage systems either to indicate the reconfigured role of the storage systems or to indicate that failure of the replication link has been resolved in a manner that allows resumption of normal processing. Following such a resolution, steps 410 through 414 are then operable as described above to continue operation of this storage system in a reconfigured role as either a backup primary storage system or in a quiesced/idle state.

Those of ordinary skill in the art will readily recognize additional processing that may be employed to restore the original working configuration of the systems following resolution of the detected failure. Such additional processing is well known to those of ordinary skill in the art and is therefore omitted herein for simplicity and brevity of this discussion.

Figure 5:
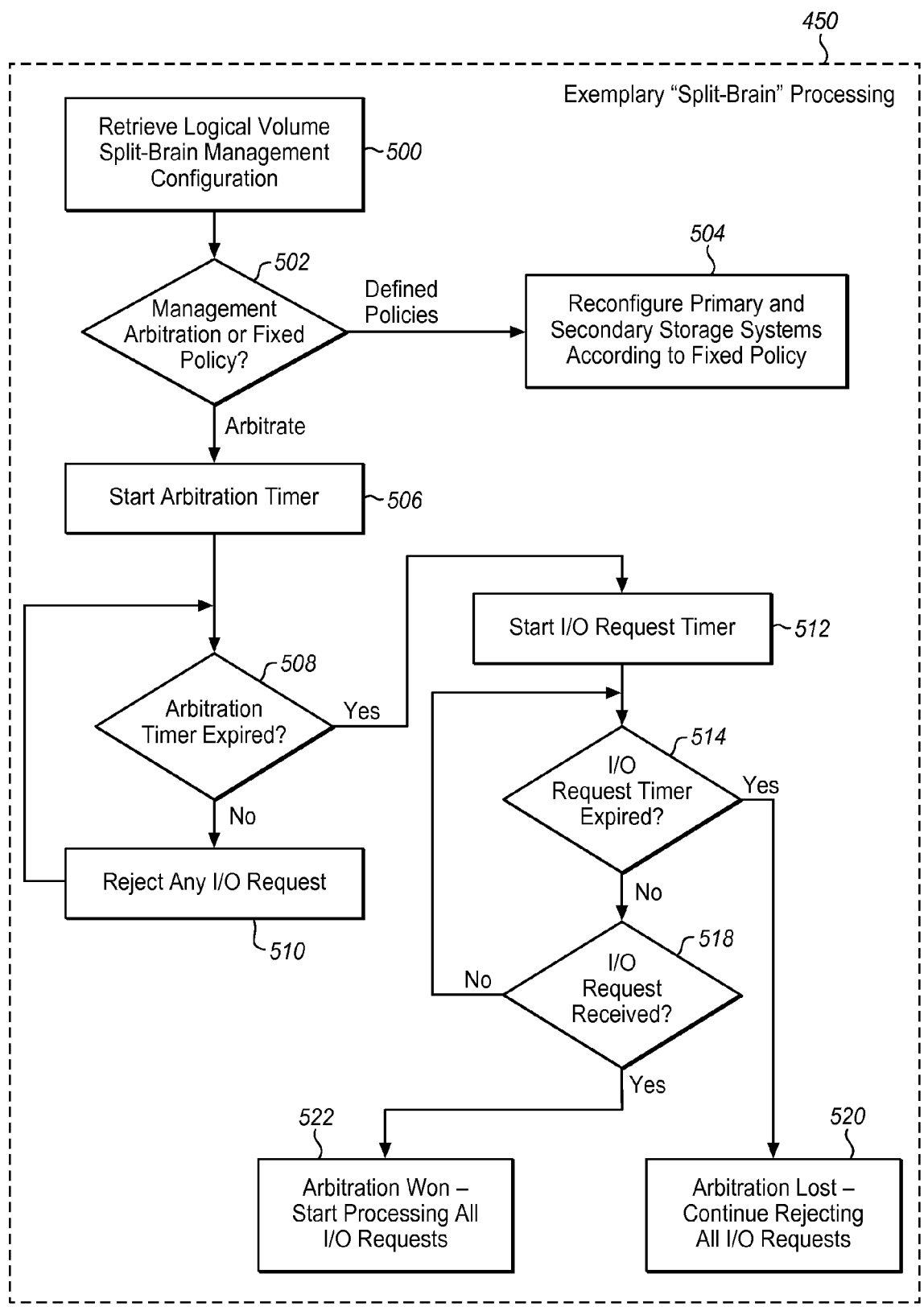

FIG. 5 is a flowchart describing exemplary additional details of split-brain processing 450 of FIG. 4. At step 500, the storage system retrieves the previously configured split-brain management configuration for the logical volume. It will be understood by those of ordinary skill in the art that, since each storage system may manage multiple logical volumes-each in a different replication group, that there may be different rules for failover processing defined for each of the multiple logical volumes managed by each storage system. Step 502 then determines whether the previously configured split-brain management configuration indicates the use of predefined policies or instead indicates that arbitration should be performed by the storage management system or administrator.

If predefined policies exist, step 504 represents appropriate processing to reconfigure the storage systems according to the fixed policy identifying which storage system should continue processing I/O requests and which storage systems should be quiesced in deference to the storage system configured to continue operation. Processing of step 504 is similar to that described above in FIG. 4 steps 410 through 414.

If step 502 indicates that arbitration techniques should be utilized, step 506 starts an arbitration timer with a predefined timeout value. At step 508, the storage system determines whether the arbitration timer has expired. If not, step 510 rejects any I/O request received while the arbitration timer continues to run and processing continues looping through steps 508 and 510 until the arbitration timer has expired. The purpose of the arbitration timer is to allow some predetermined period of time for the storage management system/administrator to the detected failure and to commence procedures to correct and/or reconfigure the systems. In one exemplary embodiment, the storage management system/administrator reconfigures one of the storage systems to continue processing I/O requests. Based on the storage system selected for continued processing, the storage management system/administrator will adjust all host systems coupled with the selected storage system to indicate that the selected storage system is again operable and that any failed (i.e., rejected) I/O requests may be retried. All other storage systems not so selected for continued operation will continue rejecting I/O requests. The storage systems determine their respective roles by awaiting receipt of a next I/O request from an attached host system. Upon expiration of the arbitration timer allowing the storage management system/administrator to select a system for continued operation, step 512 starts an I/O request timer within the storage system using a predetermined timeout value to await receipt of a next I/O request. The storage system selected by the storage management system/administrator will receive a next I/O request during the I/O request timer period while the other storage system will not receive a next request. In this manner each storage system can determines its role as decided by the storage management system/administrator. In particular, step 514 determines whether the I/O request timer has expired. If not, step 518 determines whether any I/O request has been received while the I/O request timer is running. If not, processing continues looping through steps 514 and 518 until either the I/O timer expires or an I/O request is received. If step 514 determines that the I/O request timer has expired, step 520 recognizes that the arbitration has been lost for this storage system and that this storage system should therefore continue rejecting all I/O requests in deference to another storage system that has won the arbitration process. By contrast, if step 518 determines that the storage system has received a request while the I/O request timer is running, the storage system recognizes that the storage management system/administrator has completed the arbitration reconfiguration and has configured this storage system as the winner of the arbitration. Step 522 then commences processing of all received I/O requests in this storage system operating in the role of a backup primary storage system.

Those of ordinary skill in the art will readily recognize that numerous additional and equivalent steps may be present in fully functional methods as described above in FIGS. 3 through 5. Such additional and equivalent steps are omitted herein for simplicity and brevity of this discussion. Further, the methods of FIGS. 4 through 5 describe exemplary failover processing when a secondary storage system detects a failure of the primary storage systems. Those of ordinary skill in the art will readily recognize analogous processing to that of FIGS. 3 through 5 to be performed if a primary storage system detects loss of the watchdog signal from a failed secondary storage system. In general, the primary storage system continues its operation to process received I/O requests but does not attempt to replicate any write data to the failed secondary storage system. Rather, upon sensing restoration of the failed secondary storage system, a synchronization process may be performed to update the restored secondary storage system to duplicate the data on the primary storage system.

Figure 6:
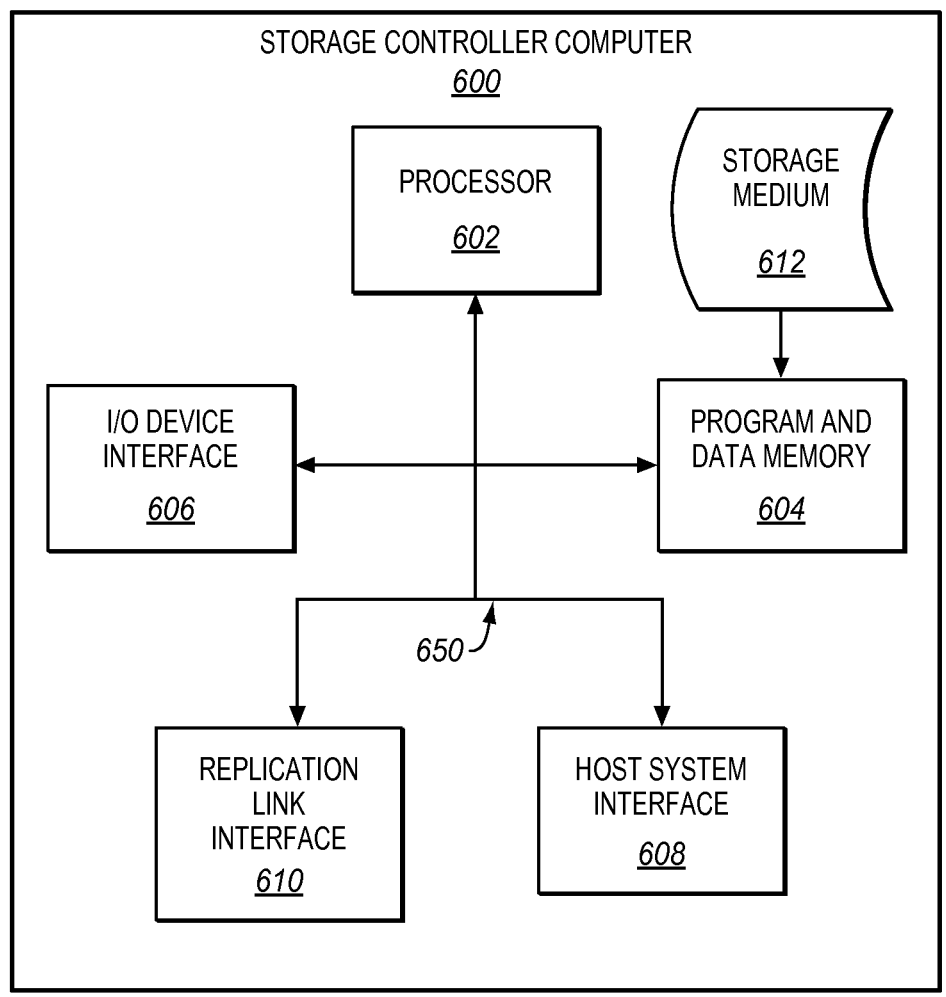
FIG. 6 is a block diagram of a storage system computer that uses a computer readable medium to load programmed instructions for performing methods in accordance with features and aspects hereof to provide improved replication and failover capabilities.

Embodiments of the invention can take the form of an entirely hardware (i.e., circuits) embodiment, an entirely software embodiment or an embodiment containing both hardware and software elements. In one embodiment, the invention is implemented in software, which includes but is not limited to firmware, resident software, microcode, etc. FIG. 6 is a block diagram depicting a storage system computer 600 adapted to provide features and aspects hereof by executing programmed instructions and accessing data stored on a computer readable storage medium 612. Computer 600 may be a computer such as embedded within the storage controller of a storage system that performs aspects of the replication and failover processing in accordance with features and aspects hereof In addition, computer 600 may be a storage management computer system that provides configuration and reconfiguration services in accordance with features and aspects hereof Furthermore, embodiments of the invention can take the form of a computer program product accessible from a computer-usable or computer-readable medium 612 providing program code for use by, or in connection with, a computer or any instruction execution system. For the purposes of this description, a computer-usable or computer readable medium can be any apparatus that can contain, store, communicate, propagate, or transport the program for use by or in connection with the computer, instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A storage system computer 600 suitable for storing and/or executing program code will include at least one processor 602 coupled directly or indirectly to memory elements 604 through a system bus 650. The memory elements 604 can include local memory employed during actual execution of the program code, bulk storage, and cache memories that provide temporary storage of at least some program code in order to reduce the number of times code must be retrieved from bulk storage during execution.

Input/output interface 606 couples the computer to I/O devices to be controlled (e.g., storage devices, etc.). Host system interface 608 may also couple the computer 800 to other data processing systems.

While the invention has been illustrated and described in the drawings and foregoing description, such illustration and description is to be considered as exemplary and not restrictive in character. One embodiment of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A system comprising:
   a primary storage system, the primary storage system comprising:
   a primary physical storage volume having an associated primary physical volume device identifier; and
   a primary storage controller coupled with the primary physical storage volume;
   a secondary storage system, the secondary storage system comprising:
   a secondary physical storage volume having an associated secondary physical volume device identifier different than the primary physical volume device identifier; and
   a secondary storage controller coupled with the secondary physical storage volume;
   a replication communication link coupling the primary storage controller with the secondary storage controller,
   wherein a logical volume is defined within both the primary storage system and the secondary storage system, the logical volume having an associated logical volume device identifier common to both the primary storage controller and the secondary storage controller,
   wherein the secondary storage system is adapted to process a write I/O request directed to the logical volume device identifier from an attached host system by shipping, via the replication link, the write I/O request to the primary storage controller for processing by the primary storage system,
   wherein the primary storage system is adapted to process a write I/O request directed to the logical volume device identifier received from an attached host system or received from the secondary storage system by storing write data on the primary physical storage volume and transferring the data to the secondary storage controller, via the replication link, to be stored on the secondary physical storage volume.

2. The system of claim 1
   wherein the secondary storage system is further adapted to sense a failure of the primary storage system, and
   wherein the secondary storage system is further adapted to reconfigure as a backup primary storage system in response to sensing the failure of the primary storage, wherein the backup primary storage system is adapted to process a received write I/O request directed to the logical volume device identifier received from an attached host system by storing write data on the secondary physical storage volume.

3. The system of claim 2
   wherein the primary storage system is further adapted to transmit periodic watchdog signals to the secondary storage system via the replication link, and
   wherein the secondary storage system is further adapted to sense the failure of the primary storage system by sensing loss of the periodic watchdog signal from the primary storage system.

4. The system of claim 1
   the primary storage system and the secondary storage system each comprise a memory storing a pre-defined split-brain policy wherein the split-brain policy indicates which of the primary storage system and the secondary storage system should continue processing I/O requests in response to sensing a failure of the replication link, wherein both the primary storage system and the secondary storage system are further adapted to sense a failure of the replication link, and wherein either the primary storage system or the secondary storage system rejects further I/O requests responsive to sensing the failure of the replication link based on the pre-defined split-brain policy.

5. The system of claim 1 further comprising:

a storage management system coupled with the primary storage system and coupled with the secondary storage system, wherein each of the storage management system, the primary storage system, and the secondary storage system are adapted to sense a failure of the replication link, wherein both the primary storage system and the secondary storage system are further adapted to reject further I/O requests responsive to sensing the failure of the replication link, wherein the storage management system is further adapted, responsive to sensing the failure of the replication link, to communicate with either the primary storage system or the secondary storage system to resume processing of I/O requests as a backup primary storage system.

6. A method for managing storage replication between a primary storage system and a secondary storage system coupled by a replication link, the method comprising:

defining a primary physical storage volume having an associated primary physical volume device identifier within the primary storage system;

defining a secondary physical storage volume having an associated secondary physical volume device identifier within the secondary storage system;

defining a logical volume within both the primary storage system and the secondary storage system, the logical volume having an associated single logical volume device identifier common to both the primary storage system and the secondary storage system;

processing a write I/O request received in the primary storage system from an attached host system requesting access to the logical volume wherein the step of processing further comprises:

storing data associated with the request on the primary physical storage volume; and transmitting the data from the primary storage system to the secondary storage system over a replication link coupling the primary storage system with the secondary storage system; and storing the data on the secondary physical storage volume;

processing another write I/O request received in the secondary storage system from an attached host system requesting access to the logical volume wherein the step of processing the another write I/O request further comprises:

shipping, over the replication link, the request to the primary storage system for processing as a request received by the primary storage system.

7. The method of claim 6 further comprising:

sensing, within the secondary storage system, a failure of the primary storage system;

reconfiguring the secondary storage system as a backup primary storage system in response to sensing failure of the primary storage system; and processing, in the backup primary storage system, a received write I/O request directed to the logical volume device identifier received from an attached host system by storing write data on the secondary physical storage volume.

8. The method of claim 7 further comprising:

transmitting periodic watchdog signals from the primary storage system to the secondary storage system via the replication link, wherein the step of sensing further comprises sensing, in the secondary storage system, loss of the periodic watchdog signal from the primary storage system.

9. The method of claim 6, further comprising:

providing a split-brain policy in both the primary storage system and the secondary storage system wherein the split-brain policy indicates which of the primary storage system and the secondary storage system should continue processing I/O requests in response to sensing a failure of the replication link;

sensing, within the primary storage system and within the secondary storage system, a failure of the replication link, and rejecting further I/O requests, within either the primary storage system or the secondary storage system, responsive to sensing the failure of the replication link based on the split-brain policy.

10. The method of claim 6 further comprising:

a storage management system coupled with the primary storage system and coupled with the secondary storage system, sensing, within the primary storage system and the secondary storage system, a failure of the replication link;

rejecting further I/O requests, within both the primary storage system and the secondary storage system, responsive to sensing the failure of the replication link;

receiving a signal, within either the primary storage system or within the secondary storage system, from a storage management system responsive to sensing the failure of the replication link;

resuming processing of I/O requests in the primary storage system responsive to receipt of the signal within the primary storage system; and resuming processing of I/O requests within the secondary storage system as a backup primary storage system responsive to receipt of the signal within the secondary storage system.

11. A non-transitory computer readable medium embodying programmed instructions which, when executed by a computer system of one or more storage systems, perform a method for managing storage replication between a primary storage system and a secondary storage system coupled by a replication link, the method comprising:

defining a primary physical storage volume having an associated primary physical volume device identifier within the primary storage system;

defining a secondary physical storage volume having an associated secondary physical volume device identifier within the secondary storage system;

defining a logical volume within both the primary storage system and the secondary storage system, the logical volume having an associated single logical volume device identifier common to both the primary storage system and the secondary storage system;

processing a write I/O request received in the primary storage system from an attached host system requesting access to the logical volume wherein the step of processing further comprises:

storing data associated with the request on the primary physical storage volume; and transmitting the data from the primary storage system to the secondary storage system over a replication link coupling the primary storage system with the secondary storage system; and storing the data on the secondary physical storage volume;

processing another write I/O request received in the secondary storage system from an attached host system requesting access to the logical volume wherein the step of processing the another write I/O request further comprises:

shipping, over the replication link, the request to the primary storage system for processing as a request received by the primary storage system.

12. The medium of claim 11, wherein the method further comprises:

sensing, within the secondary storage system, a failure of the primary storage system;

reconfiguring the secondary storage system as a backup primary storage system in response to sensing failure of the primary storage system; and processing, in the backup primary storage system, a received write I/O request directed to the logical volume device identifier received from an attached host system by storing write data on the secondary physical storage volume.

13. The medium of claim 12 wherein the method further comprises:

transmitting periodic watchdog signals from the primary storage system to the secondary storage system via the replication link, wherein the step of sensing further comprises sensing, in the secondary storage system, loss of the periodic watchdog signal from the primary storage system.

14. The medium of claim 11 wherein the method further comprises:

providing a split-brain policy in both the primary storage system and the secondary storage system wherein the split-brain policy indicates which of the primary storage system and the secondary storage system should continue processing I/O requests in response to sensing a failure of the replication link;

sensing, within the primary storage system and within the secondary storage system, a failure of the replication link, and rejecting further I/O requests, within either the primary storage system or the secondary storage system, responsive to sensing the failure of the replication link based on the split-brain policy.

15. The medium of claim 11 wherein the method further comprises:

a storage management system coupled with the primary storage system and coupled with the secondary storage system, sensing, within the primary storage system and the secondary storage system, a failure of the replication link;

rejecting further I/O requests, within both the primary storage system and the secondary storage system, responsive to sensing the failure of the replication link;

receiving a signal, within either the primary storage system or within the secondary storage system, from a storage management system responsive to sensing the failure of the replication link;

resuming processing of I/O requests in the primary storage system responsive to receipt of the signal within the primary storage system; and resuming processing of I/O requests within the secondary storage system as a backup primary storage system responsive to receipt of the signal within the secondary storage system.

* * * * *